(12) United States Patent
Lozier et al.

(10) Patent No.: US 7,805,891 B2
(45) Date of Patent: Oct. 5, 2010

(54) APPARATUS AND METHOD FOR SECURING A ROOF ASSEMBLY DURING A SEVERE WIND STORM

(75) Inventors: James Lozier, Pinellas Park, FL (US); Maurice Lozier, Pinellas Park, FL (US); Rita Lozier, Pinellas Park, FL (US)

(73) Assignee: Hurricane Harness Corporation, Pinellas Park, FL (US)

( * ) Notice: Subject to any disclaimer, the term of this patent is extended or adjusted under 35 U.S.C. 154(b) by 283 days.

(21) Appl. No.: 12/153,047

(22) Filed: May 13, 2008

(65) Prior Publication Data

US 2009/0000211 A1 Jan. 1, 2009

Related U.S. Application Data

(60) Provisional application No. 60/924,547, filed on May 18, 2007.

(51) Int. Cl.
*E04B 7/00* (2006.01)
*E04D 1/34* (2006.01)

(52) U.S. Cl. .......................... 52/23; 52/4; 52/DIG. 11; 52/698; 52/DIG. 12

(58) Field of Classification Search .................. 52/292, 52/3, 4, 5, 294, 295, 23, DIG. 11, DIG. 12, 52/698
See application file for complete search history.

(56) References Cited

U.S. PATENT DOCUMENTS

| | | | | |
|---|---|---|---|---|
| 1,864,403 A * | 6/1932 | Bradley | ....................... | 403/213 |
| 3,828,491 A * | 8/1974 | Koon et al. | ..................... | 52/23 |
| 3,871,142 A * | 3/1975 | Abbott | ............................ | 52/23 |
| 3,894,365 A * | 7/1975 | Abbott | ............................ | 52/23 |
| 3,943,670 A * | 3/1976 | Miller | ............................ | 52/23 |
| 5,355,640 A * | 10/1994 | Frye | ................................ | 52/23 |
| 5,537,786 A * | 7/1996 | Lozier et al. | .................... | 52/23 |
| 5,570,545 A * | 11/1996 | Adams | ........................... | 52/23 |
| 5,623,788 A * | 4/1997 | Bimberg et al. | ................ | 52/23 |
| 5,687,512 A * | 11/1997 | Spoozak et al. | ................ | 52/23 |
| 5,881,499 A * | 3/1999 | Luzzi | ............................. | 52/23 |
| 5,983,572 A * | 11/1999 | Laboy | ........................... | 52/23 |
| 6,088,975 A * | 7/2000 | Wiegel | ...................... | 52/169.1 |
| 6,481,165 B1 * | 11/2002 | Romary et al. | ............. | 52/122.1 |
| 6,722,085 B2 * | 4/2004 | Pittman | ......................... | 52/23 |
| 6,843,027 B2 * | 1/2005 | Gaddie et al. | ................ | 52/92.1 |
| 6,865,852 B2 * | 3/2005 | Gower | .......................... | 52/222 |

(Continued)

*Primary Examiner*—Robert J Canfield
*Assistant Examiner*—Brent W Herring
(74) *Attorney, Agent, or Firm*—Squire, Sanders & Dempsey, LLP

(57) ABSTRACT

A strapping system includes a roof assembly including a plurality of receiving channels; each of the plurality of receiving channels is fastened to interconnected roof materials connected to a roof structure. The roof assembly also includes a plurality of roof channels that are connected by the plurality of receiving channels and fastened to the interconnected roof materials. The strapping assembly also includes a plurality of straps for tying down the roof assembly to a corresponding plurality of anchors. The strapping assembly further includes a plurality of tensioning devices. On opposite sides of the building, each of the plurality of straps is fastened to a corresponding ratchet assembly attached to a corresponding anchor of the plurality of anchors, thereby transferring load from the roof assembly to the foundation of the structure during a high wind storm such as a, hurricane, typhoon, cyclone or a tornado.

15 Claims, 12 Drawing Sheets

U.S. PATENT DOCUMENTS

| | | | |
|---|---|---|---|
| 7,310,913 B2 * | 12/2007 | Pierce | 52/23 |
| 7,392,620 B1 * | 7/2008 | Watson, Jr. | 52/4 |
| 7,484,334 B1 * | 2/2009 | Oviedo-Reyes | 52/23 |
| 7,578,100 B2 * | 8/2009 | Sicurella | 52/4 |
| 7,600,347 B2 * | 10/2009 | Lindstrom | 52/4 |
| 7,726,081 B1 * | 6/2010 | Bennardo et al. | 52/222 |
| 2007/0000183 A1 * | 1/2007 | Logan | 52/3 |
| 2007/0181171 A1 * | 8/2007 | Roberts | 135/118 |
| 2007/0186489 A1 * | 8/2007 | Osbon et al. | 52/23 |
| 2007/0209291 A1 * | 9/2007 | Perez | 52/23 |
| 2007/0266644 A1 * | 11/2007 | Weicht | 52/3 |
| 2008/0115426 A1 * | 5/2008 | Hawkins | 52/23 |
| 2009/0049758 A1 * | 2/2009 | Leonard | 52/23 |
| 2009/0145047 A1 * | 6/2009 | Gorman | 52/4 |

* cited by examiner

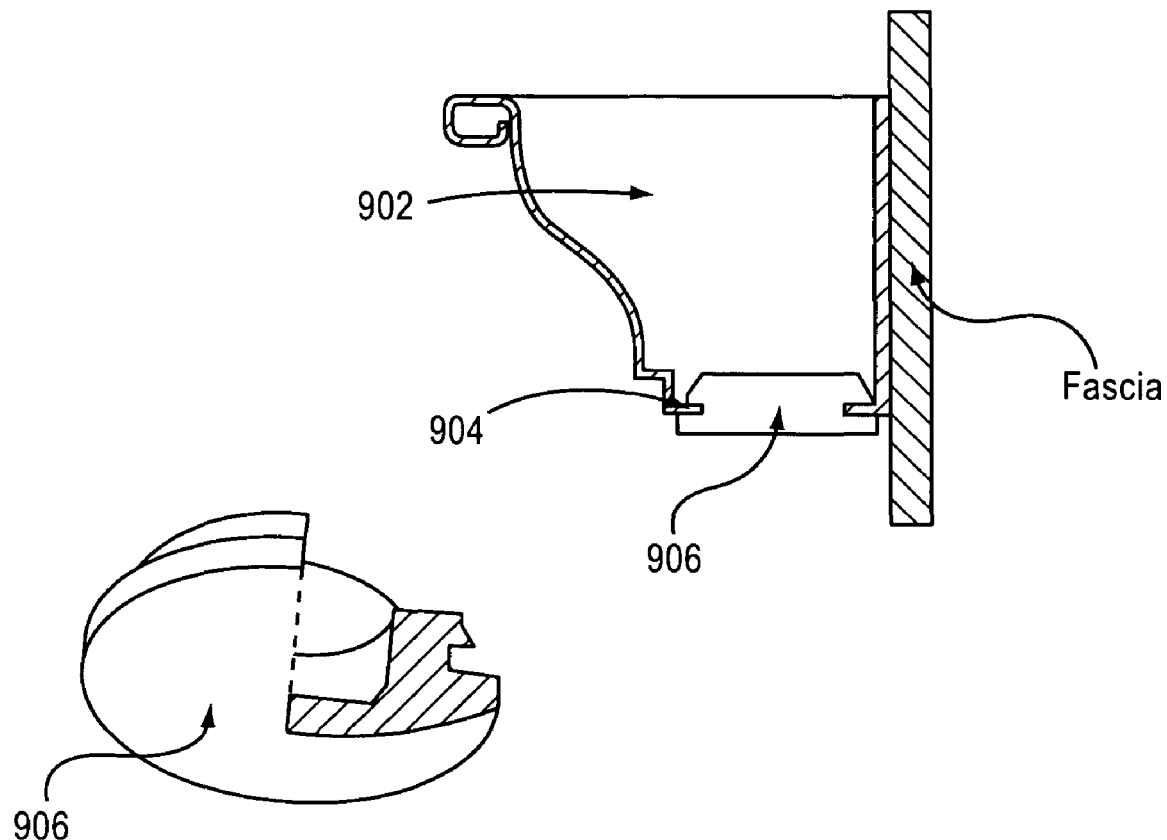
FIG.9a
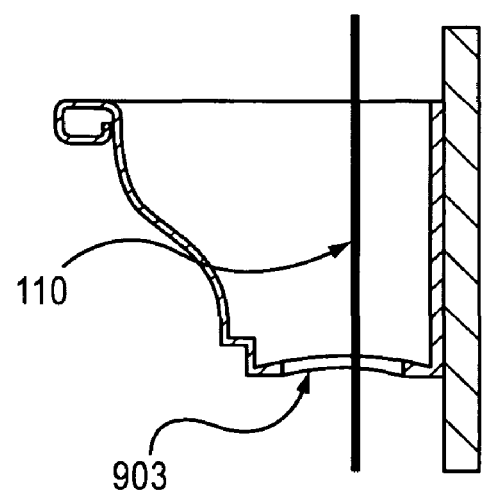
FIG.9c
FIG.9b

APPARATUS AND METHOD FOR SECURING A ROOF ASSEMBLY DURING A SEVERE WIND STORM

BACKGROUND OF THE INVENTION

1. Field of the Invention

The present invention relates to a system and method of tying down a roof structure of a building to prevent the roof structure from blowing off during a severe storm, and more particularly, to a system and method for strapping down a roof assembly such that uplift pressures to the roof assembly are transferred to the foundation of the building during a severe wind storm.

2. Description of the Related Art

During a storm with severe winds, such as a hurricane, a roof structure made of individual, interconnected roof materials is likely to detach from a building. Examples of such roof structures include metal pan roof structures on commercial/industrial buildings and roof structures on some residential buildings, such as mobile homes. For roof structures with individual, interconnected roof materials, such as metal pans, the bottom pan of each individual roof material is typically face screwed to the top of the building's sheathing or structural support frame and the individual roof materials are interconnected with various pre-existing interlocking design systems.

When a metal pan roof system is exposed to extreme winds, such as hurricanes or tornadoes, un-repairable damage is likely to occur when fasteners attaching the metal roof panels to the structural frame fail. The fasteners typically fail under pressure differentials (lift) created by airfoil (vacuum), as a consequence of high velocity winds over the surface of the roof compounded by high velocity of winds entering the structure. This causes wind capture which is the development of an internal pressure to the underside of the roof panels.

There is currently no system for tying down roof structures with individual interconnected roof materials. Due to the lack of appropriate systems for strapping down these roof structures, insurance companies typically hesitate to insure buildings with individual interconnected roof materials.

SUMMARY OF THE INVENTION

The present invention provides a method for strengthening a roof with channels, which may be permanently or temporarily placed at the eaves, mid span, and ridge of the building. The roof is able to accept an extremely strong, low stretch strapping system which is installed over the channelling system and threaded into ratchets fastened to the foundation of the building and tightened. The roof assembly is consequently provided a positive uninterrupted downward load disbursement that passes through the tie-down assembly directly to anchors attached to the foundation of the building.

An embodiment of the present invention is directed to a strapping system including a roof assembly. The roof assembly includes a plurality of receiving channels, each of the plurality of receiving channels being fastened to interconnected roof materials connected to a roof structure. The roof assembly also includes a plurality of roof channels that are connected by the plurality of receiving channels and fastened to the interconnected roof materials, such that a row of interconnected roof channels and receiving channels is placed over the interconnected roof materials along a length of a roof structure. The strapping assembly also includes a plurality of straps for tying down the roof assembly to a corresponding plurality of anchors, each of the plurality of anchors being secured at predetermined distances at opposite sides of a foundation of a building. The strapping assembly further includes a plurality of tensioning devices mounted, at predetermined distances, on the roof materials between rows of interconnected roof channels and receiving channels, the plurality of tensioning devices being for eliminating vertical displacement of the fastened straps. Each of the plurality of straps is placed at a predetermined distance along the length of the roof structure over rows of interconnected roof channels and receiving channels and is threaded in a corresponding tensioning device that is lined up with a corresponding anchor at the foundation of the building. On opposite sides of the building, each of the plurality of straps is fastened to a corresponding ratchet assembly attached to a corresponding anchor of the plurality of anchors, thereby transferring load from the roof assembly to the foundation of the structure during a wind storm.

Another embodiment of the invention is directed to a roof assembly including a plurality of receiving channels, each of the plurality of receiving channels being fastened to interconnected roof materials connected to a roof structure. The roof assembly also includes a plurality of roof channels that are connected by the plurality of receiving channels and fastened to the interconnected roof materials, such that a row of interconnected roof channels and receiving channels is placed over the interconnected roof materials along a length of a roof structure. The roof assembly is strapped by a plurality of straps placed at predetermined distances along a length of a roof structure. On opposite sides of a building, each of the plurality of straps is fastened to a corresponding ratchet assembly attached to a corresponding anchor, thereby transferring load from the roof assembly to the foundation of the structure during a wind storm.

Another embodiment of the invention is directed to a method including fastening a plurality of receiving channels to interconnected roof materials connected to a roof structure. The method also includes connecting a plurality of roof channels to the plurality of receiving channels and fastening the connected plurality of roof channels to the interconnected roof materials. The method further includes placing a row of interconnected roof channels and receiving channels over the interconnected roof materials along a length of a roof structure. The method also includes securing a plurality of anchors at predetermined distances at opposite sides of a foundation of a building and mounting a plurality of tensioning devices, at predetermined distances, on the roof materials between rows of interconnected roof channels and receiving channels, the plurality of tensioning devices being for eliminating vertical displacement of the fastened straps. The method also includes placing each of a plurality of straps at a predetermined distance along the length of the roof structure over rows of interconnected roof channels and receiving channels, threading each of the plurality of straps in a corresponding tensioning device that is lined up with a corresponding anchor at the foundation of the building, and on opposite sides of the building, fastening each of the plurality of straps to a corresponding ratchet assembly attached to a corresponding anchor, thereby transferring load from the roof assembly to the foundation of the structure during a wind storm.

Another embodiment of the invention is directed to an apparatus including fastening means for fastening a plurality of receiving channels to interconnected roof materials connected to a roof structure, connecting means for connecting a plurality of roof channels to the plurality of receiving channels and fastening the connected plurality of roof channels to the interconnected roof materials. The apparatus also includes placing means for placing a row of interconnected roof channels and receiving channels over the interconnected roof materials along a length of a roof structure and securing means for securing a plurality of anchors at predetermined distances at opposite sides of a foundation of a building. The apparatus further includes mounting means for mounting a plurality of tensioning devices, at predetermined distances, on the roof materials between rows of interconnected roof channels and receiving channels, the plurality of tensioning devices being for eliminating vertical displacement in the fastened straps. The apparatus further includes placing means for placing each of a plurality of straps at a predetermined distance along the length of the roof structure over rows of interconnected roof channels and receiving channels, threading means for threading each of the plurality of straps in a corresponding tensioning device that is lined up with a corresponding anchor at the foundation of the building and on opposite sides of the building, fastening means for fastening each of the plurality of straps to a corresponding ratchet assembly attached to a corresponding anchor, thereby transferring load from the roof assembly to the foundation of the structure during a wind storm.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIGS. 9a, 9b and 9c illustrate a gutter plug;

DETAILED DESCRIPTION OF PREFERRED EMBODIMENTS

Reference will now be made to the preferred embodiments of the present invention, examples of which are illustrated in the accompanying drawings.

The present invention provides a method for strengthening a roof with, for example, aluminium channels, which may be permanently or temporarily placed at the eaves, mid span, and ridge of the building. The roof is able to accept an extremely strong, low stretch strapping system which is installed over the channeling system and threaded into ratchets fastened to the foundation of the building and tightened. The building's entire roof assembly is, therefore, provided a positive downward load disbursement, which passes through the tie-down assembly directly to the foundation of the building.

Figure 1A:
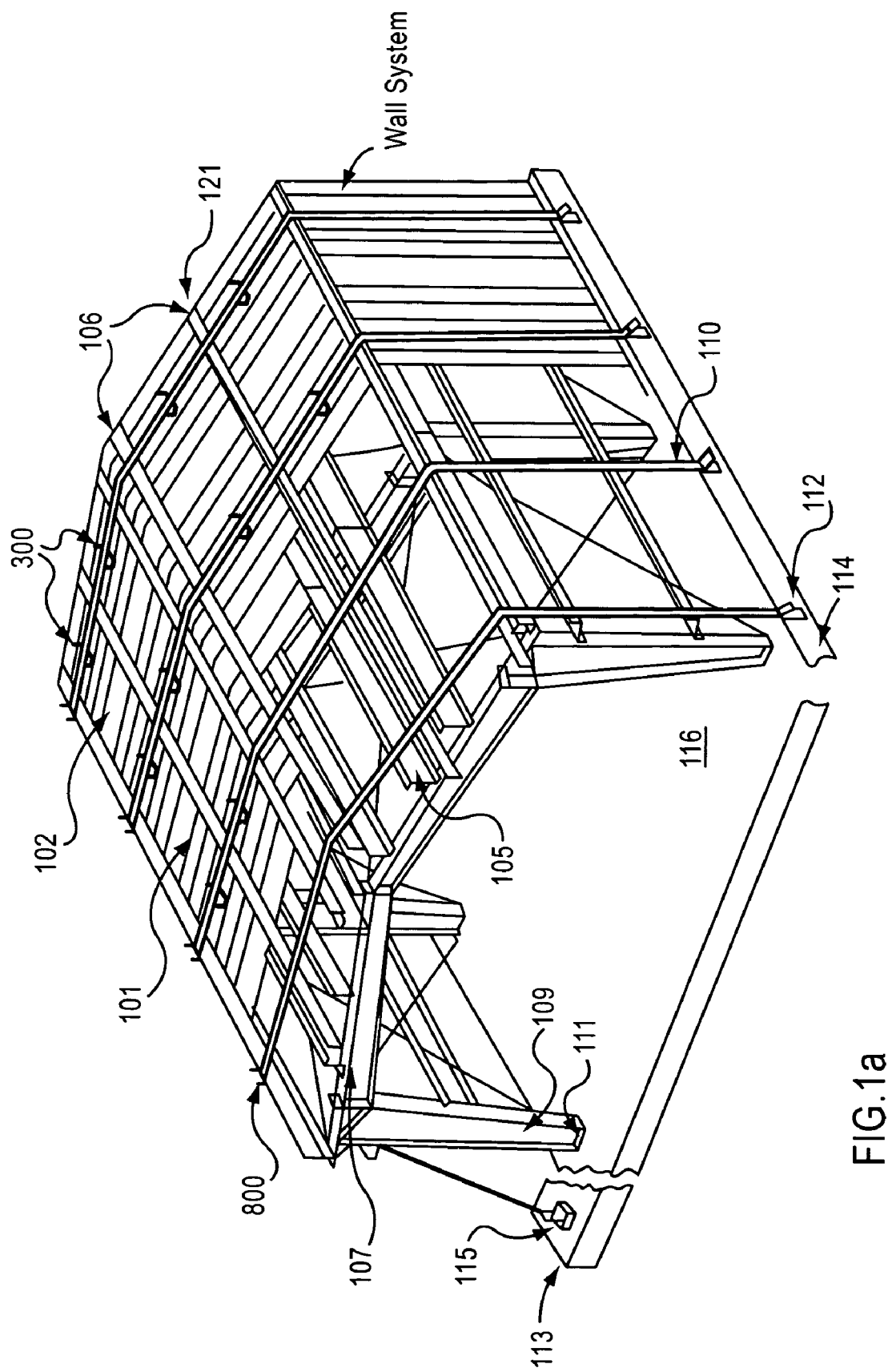
FIG. 1a illustrates an embodiment of the present invention in which a plurality of tie-down straps are tensioned between a corresponding plurality of anchors, secured at a foundation of a building.

FIG. 1a illustrates an embodiment of the present invention in which a plurality of tie-down straps 110 are tensioned between a corresponding plurality of anchors 112,115, secured at predetermined distances at opposites sides along a foundation wall 114 of a building or a concrete slab 113,116. The building may be a commercial, industrial, residential, mobile, modular, or other free standing or add-on structure. The pluralities of straps 110 are secured at the plurality of anchors 112,115 by, for example, ratchet winches. The plurality of straps 110 are placed over rows of channels 106 of a roof assembly 101 to thereby transfer load from the roof assembly 101 to the foundation 114 of the structure.

Figure 1B:
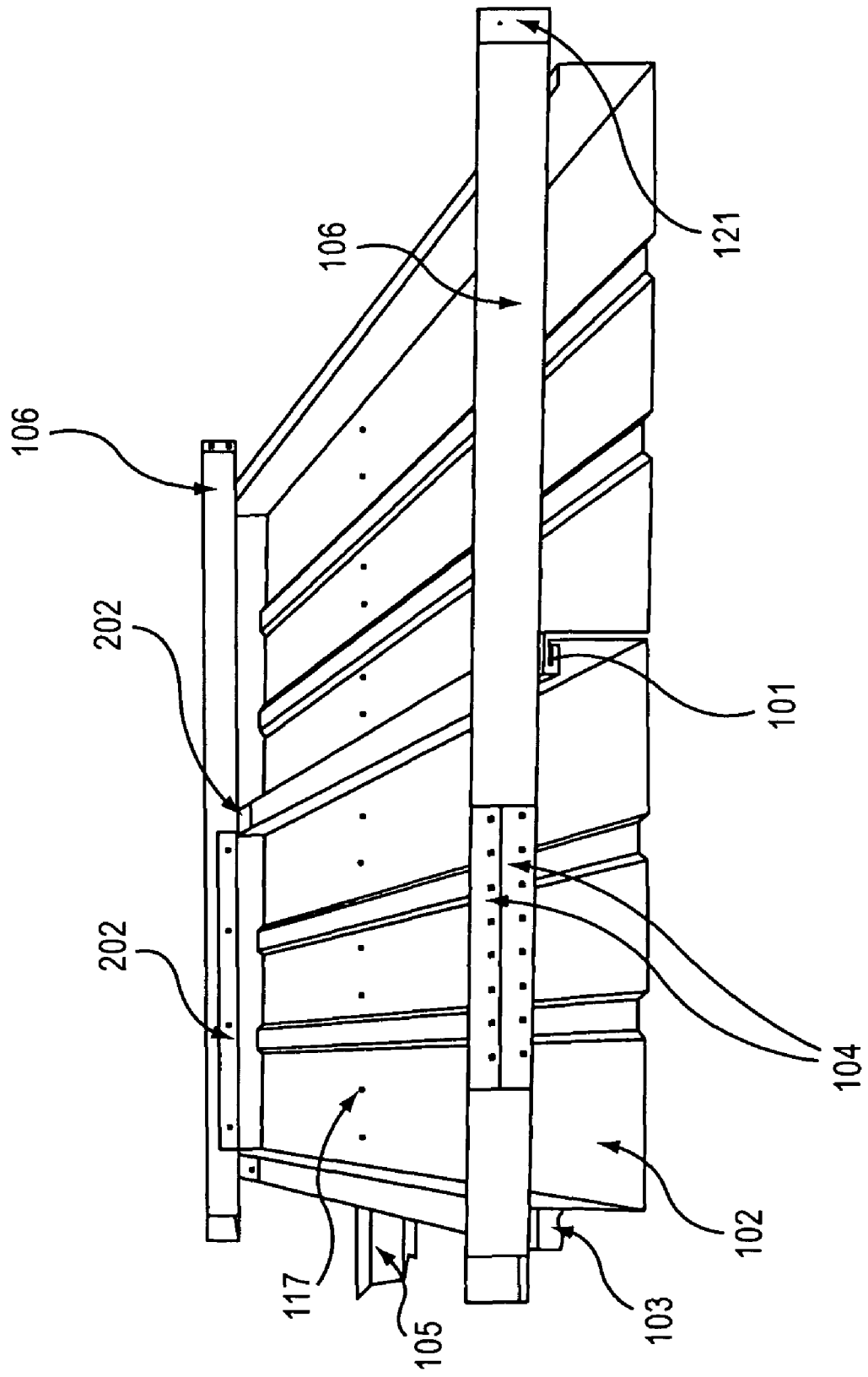
FIG. 1b illustrates components of a roof assembly which may be used in embodiments of the present invention.

FIG. 1b, in conjunction with FIG. 1a, illustrates components of a roof assembly 101 which may be used in embodiments of the present invention. Roof assembly 101 includes a plurality of receiving channels/channel connectors 106 that are fastened across the top of the high rib of a plurality of independent interlocking roofing materials 102. Independent interlocking roofing material 102, for example metal panels, form a plurality of unified sheets from the eaves to the ridge of the building. Panels 102 are fastened using screws or clips 117 to a plurality of various roof sheathings, rafters, trusses, plywood, battens, or purlins 105 fastened to a plurality of structural support framing such as headers, beams, walls, or roof girders 107. A plurality of channels 106 (hereinafter roof channels) are placed between a plurality of channel clips 202 and also fastened to the top rib 101, 103 of the interlocking roof materials 102, as shown, FIG. 1b.

The roof girders are further fastened to a plurality of rigid frame support columns or walls which are bolted to the foundation of the building with anchor bolts 111, typically installed prior to pouring the concrete slab. Alternatively, holes may be drilled into an existing foundation wall 114 or slab 113, 116 to receive additional foundation attachments, such as threaded bolts and/or threaded connectors, shown as 112,115. The additional foundation attachments may be set in two part epoxy 406 to allow for attachment of an anchor assembly 112,115. As noted above, the anchor assembly 112, 115 may be attached to a ratchet assembly, which is attached to a variable length of strap 110.

Roof channels 106 are placed in a channel clip 202 so that a row of interconnected roof channels 106 and channel clip 202 is fastened to a plurality of top ribs 115 of interlocking roof panels 101 along the entire length of the building. Roof channels 106 may be, for example, tubular aluminum through which straps 110 are applied over the top portion of each stock, thereby allowing for a uniformed distribution of downward force. A first row of interconnected roof channels 106 and channel clip 202 may be placed at the eave of the roof, near a gutter assembly. Thereafter, rows of interconnected roof channels 106 and channel clip 202 are placed at predetermined distances from the eave to the ridge of the roof. The placement of rows of interconnected roof channels 106 and channel clip 202 occur on opposite sides of the building. In an embodiment of the invention, the predetermined distance may be twenty-five feet, although, the distance may be more or less than twenty-five feet and still fall within the scope of the invention. To eliminate vertical displacement in the plurality of straps 110 for fastening roof assembly 101 to the building, a tensioning device (discussed below and shown in FIGS. 3a and 3b) is mounted at the base of the metal pan roof materials 102 between the rows of interconnected roof channels 106 and channel clip 202.

During a severe wind storm, each of the plurality of straps 110 is placed over the rows of interconnected roof channels 106 and channel clip 202 and within the tensioning devices that are lined up with ratchet assemblies at the foundation of the structure. Each of the ratchet assemblies are anchored at the foundation of the building with an associated anchor 112,115. The plurality of straps 110 then are fastened, on opposite sides, at the foundation of the building through the ratchet assemblies then tightened, thereby transferring load from the roof structure to the foundation of the structure.

In an embodiment of the invention, each channel 106 is a 3 by 3 aluminum channel. It should be noted that channel 106, channel clip 202, and channel connector 104 may be other dimensions and may be comprised of materials other than aluminum. As is known to one skilled in the art, the width of the roof materials 102 may vary. The rib 103,101 of roof materials 102 is generally one or two foot wide and each channel clip 202 is fastened to the top rib 103 of two interlocking roof assemblies 101. Channel clip 202 may be fastened to the top ribs of roof assemblies 101, 103 at varying distances. In one embodiment, the channel clip 202 may be fastened, ten to twelve feet apart, to ribs 101,103 of roof materials 102. Roof channels 106 are placed between fastened channel clips 202 and screwed together with the channel clip 202, through the flange 202 to the roof materials 101, 103. Thus, roof assembly 101 in embodiments of the invention includes individual interconnected roof materials 102, channel clip 202, channel connectors 104, roof channels 106, and end caps 121.

In an embodiment of the invention, each roof channel 106 is a 3 by 3 aluminum channel with a 0.125 gauge. It should be noted that roof channels 106 may be of various gauges or sizes and that roof channels 106 may be made of material other than aluminum. At the end of the building, a cap 121 is placed on the end of each row of interconnected roof channels 106 and channel clip 202 to prevent animals or birds nesting or entering roof channels 106. In an embodiment of the invention, from the eave of the roof to the ridge of the roof, a row of interconnected roof channels 106 and channel clip 202 is fastened to the roof structure every twenty five feet. So, for example, if the distance from the eave to the ridge of a roof is fifty feet, the first row may be fastened at the eave, the next row may be fastened in the middle of the roof at twenty-five feet, and the last row may be fastened at the ridge of the roof. In another example, if the distance from the eave to the ridge of a roof is one hundred feet, the first row may be fastened at the eave, the next row may be fastened at twenty-five feet from the eave, and then at fifty feet from the eave, and at seventy-five feet from the eave and the last row may be fastened at the ridge of the roof. As noted above, other predetermined distances may be used to attach rows of interconnected roof channels 106 and using channel clip 202 to the roof structure.

Figure 2A:
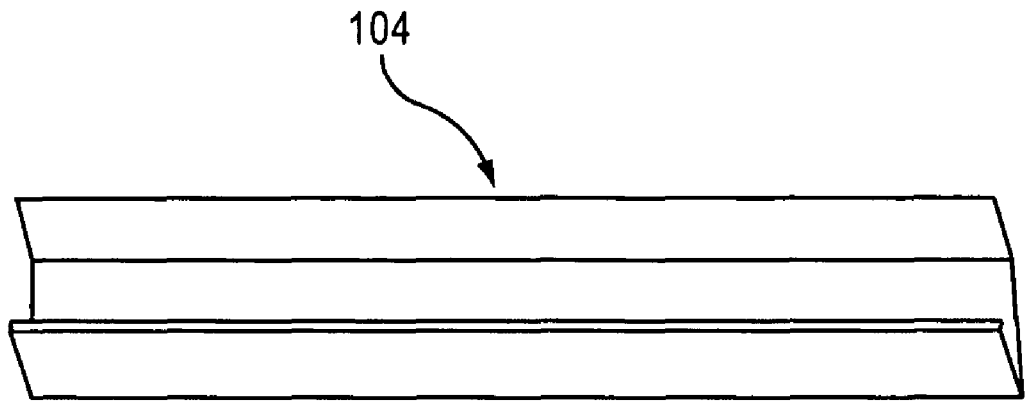
FIG. 2 illustrates an embodiment of a receiving channel which is used to interconnect roof channels to the roof assembly.
Figure 2B:
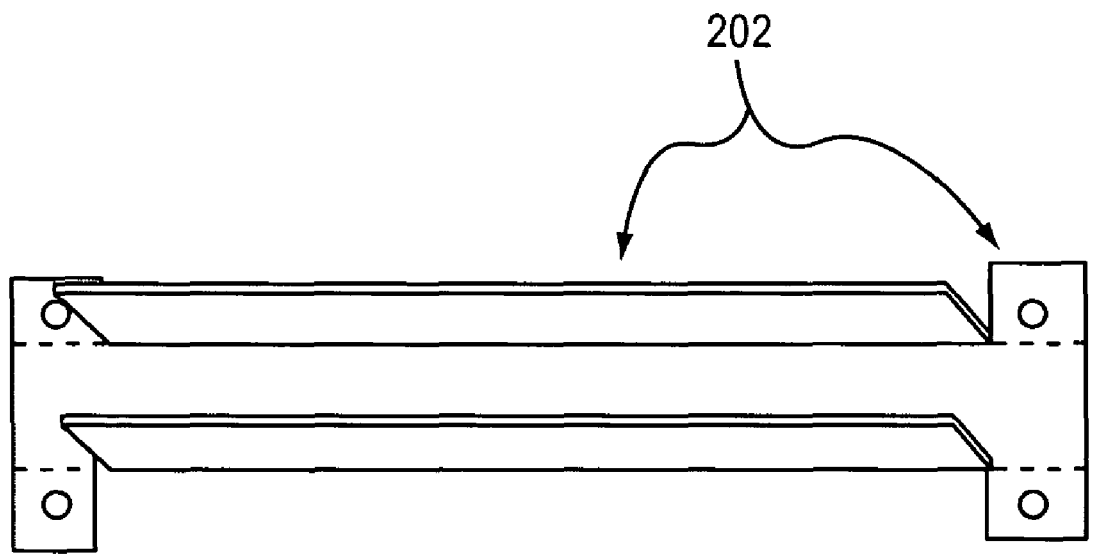

FIG. 2 illustrates an embodiment of channel clip 202 which is used to connect roof channels 106 to the roof structure. Channel clip 202 may include a bottom portion 202 and a top portion 204 between which two roof channels 106 are connected. Clips are used to tightly fasten channel 106 to the top rib 101,103 of roof materials 102. The clips are designed to prevent channel 106 from blowing or falling off the roof when a strapping system is not being used. For example, the clips are used to prevent channel 106 from blowing or falling off the roof in a mild wind storm which is not severe enough to blow off the roof, such that the roof is not strapped down, but which may be severe enough to blow off channel 106.

In an embodiment of the invention, roof channels 106 are installed over the top ribs 101,103 of roof materials 102, thereby enabling rain water to flow without disruption and without penetration to the base of the metal roof pans which may cause leakage within the building interior. A plurality of channel clips 202, with a flange on both sides and both ends are fastened on top of two or more top ribs 101,103 of interlocking roof materials 102. Pluralities of aluminium fasteners are installed on both sides and both ends to connect roof channels 106 firmly to the top of the roof panel ribs 101,103. The plurality of flanges 202, provide a point of fastening to the top rib 101,103, wherein the screw heads do not interfere with the channels ability to firmly rest on top of the interlocking roof panel ribs 101,103. Pluralities of fasteners are used to join the length of corresponding channels together with equally sized top and bottom channel connector 104. End caps 121 equal to the dimension of the roof channels 106 are applied to each open end and then fastened with a plurality of screws to prevent birds or other animals from entering the roof channel. Fasteners consisting of aluminium or other weather resistant composite may be used. Aluminium screws may be used to prevent rusting in exposed weather environments. Other fastening devices, such as clips or other non-corrosive fastening means may also be used.

In embodiments of the invention, each of the plurality of straps 110 for tying down roof assembly 101 may be two inch or three inch wide straps, depending on the application. It should be noted that straps of other dimensions (or other materials or configurations, such as chains, wires, cables or other load bearing systems) may also be used. The distance between the pluralities of straps 110 is preferably no greater than about twenty-five feet apart. However, the distance between the pluralities of straps 110 may be greater than about twenty-five feet apart and still fall within the scope of the present invention. It should be noted that various types of straps may be used in embodiments of the invention. For example, the straps 110 may be comprised of aramid filament yarns, encapsulated in polyester and anti-abrasive yarns. The strap 110 preferred may be comprised of various aramid filament yarns such as Kevlar®, Spectra®, or other comparable aramid filaments selected for their superior strength and their resistance to elongation. The aramid filament yarns may be woven, weaved or encapsulated in polyester woven or other comparable anti-abrasive nylon yarn selected for their superior ability to resist weather environments. Thus such material may be selected according to its characteristics such as, ultra-violet protection or tolerance of and/or resistance to salt water or other weathering events, for extended periods of exposure. Such material may be expected to be left in place for an extended period of time, and consequently may also be selected so as not to significantly degrade in a coastal outdoor environment.

Use of the invention is contemplated as employing an initial, pre-use installation, which includes locating and positioning channel clips 202, channels 106, channel connectors 104, end caps 121, determining the number and location of anchors 112,115 and securing any tensioning devices 300 and corner guides 800 at appropriate positions on the roof assembly 102. At this point in time, the tie-down straps 110, cut for length and associated ratchets 500 and anchors 112,115 assembled together with corresponding ratchets and anchors for the other side of the building are not installed on the building but are stored in a suitable place. The second phase of use occurs when a high wind storm, such as a hurricane or other storm is imminent, then it is necessary to position the tie-down straps 110 over the associated channeling systems and tightened. It is presently contemplated that the best way to do this is to climb on top of the roof and manually position the straps 110, over the channel assembly 106, through the roof tension assemblies 101 and corner guides 800 before engaging the tie-down strap 106 into the ratchets 112,115. It may also be contemplated that a feeder line may placed over the roof and placed within the strap guide 800 and fastened or clipped to one or both ends of the strap to draw the strap over the roof from the ground; in fact all of the straps can be pulled over at the same time either manually or mechanically, in the usually case of a simple residential building or low rise commercial building. This leader line may consist of a light wire or fishing line permanently or temporarily pre-positioned over the roof and drawn manually, electronically or mechanically. The leader line may be provided with an alligator clip at one or both ends or other connecting devices and may be housed in an access container mounted on the roof, or within the gutter or simply left in place over the roof channel assembly 106 until deployment of the tie-down assembly is required.

Figure 3A:
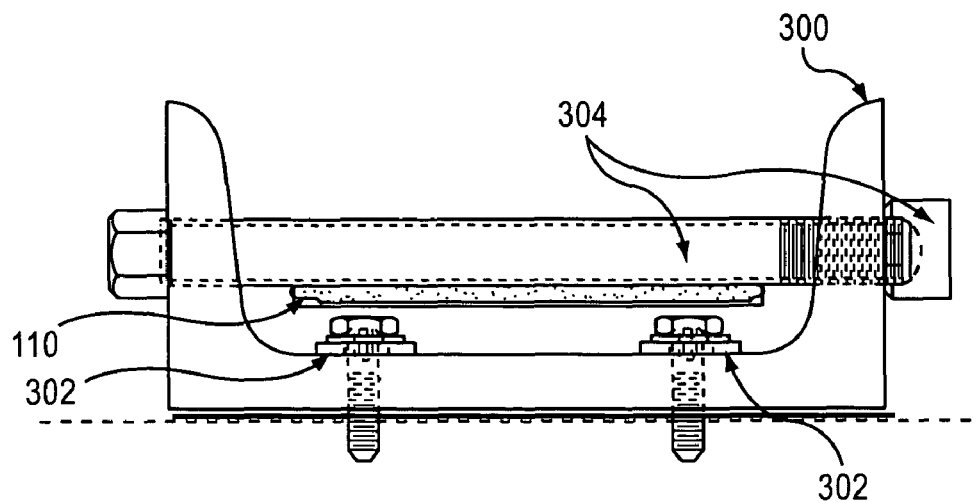
FIGS. 3a and 3b illustrate an embodiment of a tensioning device which is used to eliminate vertical displacement in the fastened straps.
Figure 3B:
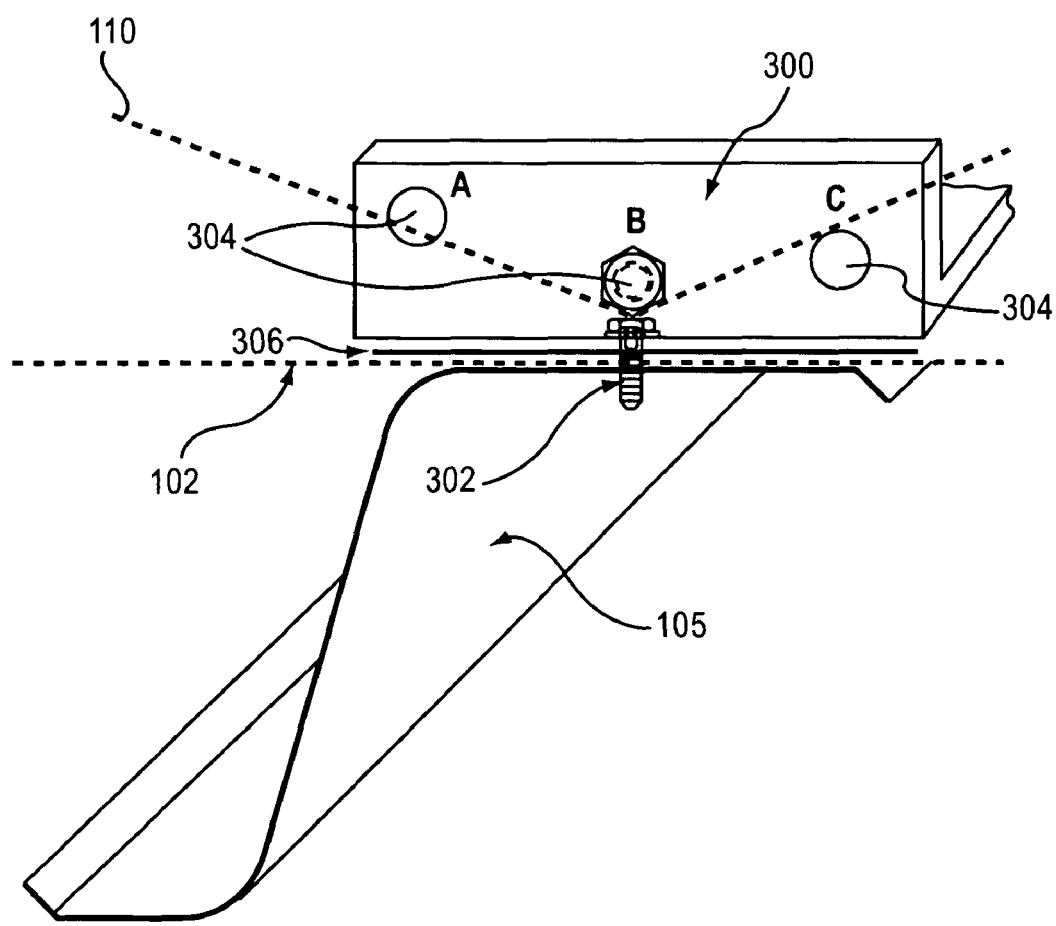
Figure 4:
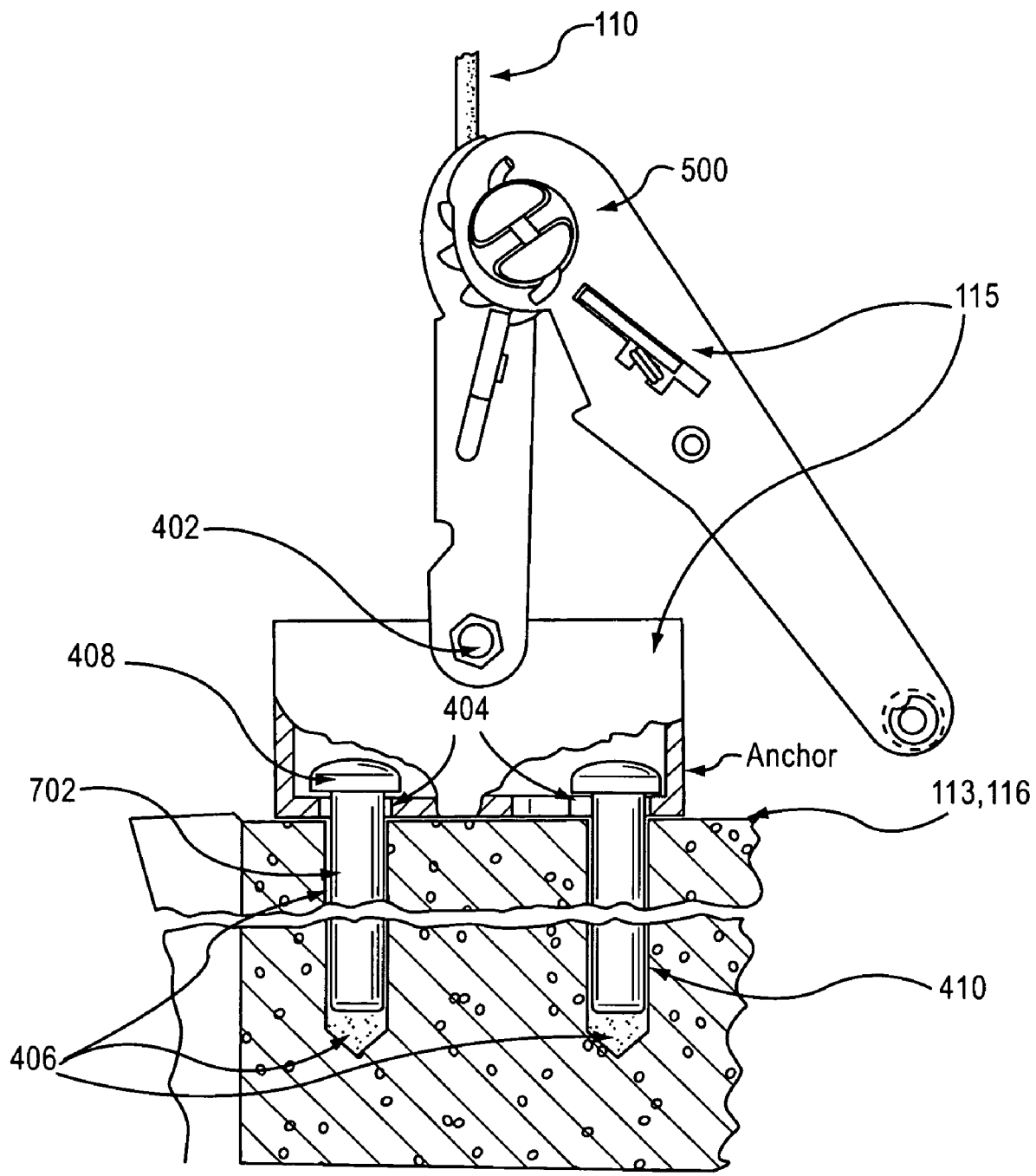
FIG. 4 illustrates an embodiment of the invention where each strap is connected to the slab of the building through a ratchet which is bolted to an anchor.

When each of the plurality of straps 110 is fully tightened over the roof assembly 101, there is typically a vertical lift at a distance, for example at fifty feet. FIGS. 3a and 3b illustrates an embodiment of the tensioning device 300 which is used to eliminate vertical displacement in the fastened straps. Tensioning device 300 includes retaining side walls with adjustable matching holes 304 on opposite sides, to receive a bolt and locking nut assembly 304. Tensioning device 300 may be composed of various materials, such as aluminum, stainless steel, or other materials to resist environmental conditions. The bolt may consist of a threaded shaft 702 to receive lock nut 304 or a pass through hole to receive a locking cotter pin. Tensioning device 300 is mounted on the roof metal pan base materials 102 with adhesive sealant 306 and screwed down, for example with self tapping screws 302, or bolts with locking nuts through the roof materials 102 into the structural purlin 105 of the building roof design, typically a zinc or other composite material. An adhesive material 306, for example a peel and stick sealant, attached to the bottom of tensioning device 300 prevents water intrusion through roof materials 102. The sealant may also consist of other water prevention intrusion materials such as caulking.

As noted above, tensioning device 300 is lined up with a ratchet assembly at the foundation of the structure. Tensioning device 300 includes a bolt assembly 304 for tightening one of the pluralities of straps 110, which is threaded through tensioning device 300, to eliminate vertical displacement in a tightened strap. Bolt assembly 304 may be fastened at various heights. In an embodiment of the invention, the heights for the fastening bolt assembly 304 are approximately one half an inch apart. When one of the pluralities of straps 110 is passed through a tensioning device 300 closest to the eave of the roof, bolt assembly 304 is likely to be fastened in the lowest height hole (B), as shown in FIG. 3b. When the strap is passed through the tensioning device 300 closest to the ridge of the roof, bolt assembly 304 is likely to be fastened in the highest height hole (A) in FIG. 3b to permit adjustment in tensioning device 300. Under other circumstances, a middle height hole (C) can be used for the bolt assembly 304, typically for tension devices that may lie an intermediate position between the eave and the ridge of the roof.

Tensioning device 300 may be installed when the extended distance between the roof channels 106 from the eave to the ridge of the building exceeds about twenty five feet, such that a vertical displacement upon the order of three inches is likely to develop. Unlike a telephone line which may sag overtime, straps 110 are likely to lift during high winds. So tensioning device 300 may be used to eliminate any vertical lift displacements of the straps. One method of attaching tensioning device 300 is by penetrating the base of roof materials 102 with self tapping screws or various length through bolts with washers and lock nuts 302 into the structural purlin 105. The placement of tensioning device 300 falls in line with channel guides FIG. 8 and the foundation ratchet and anchor assemblies. The placement of tensioning device 300 provides the user with a guide for placement of straps that are deployed. In an embodiment of the invention, the strap is placed into the corresponding ratchet assembly, brought over the eave of the roof, placed in line with tensioning device 300, placed over the ridge to the corresponding eave on the opposite of the building and into the corresponding ratchet assembly. Once the strap is fully ratcheted and the building roof is placed under a positive load, tensioning device 300 channel adjustment bolt and nuts are removed. An installer, beginning at the eave and working towards the ridge, steps on the strap to thereby hold the strap down onto the roof deck. The installer places the straps between the retaining side walls of tensioning device 300 and inserts the adjustable tension bolt with locking nut above the strap into one of the corresponding adjustment holes. This process continues until all the straps are in proper position. By this standard of use, roof channels 106 are firmly held to the high ribs of the roof deck with a positive downward load. Tension device may consist of other material such as turnbuckles, clips or other clamping device.

Figure 7:
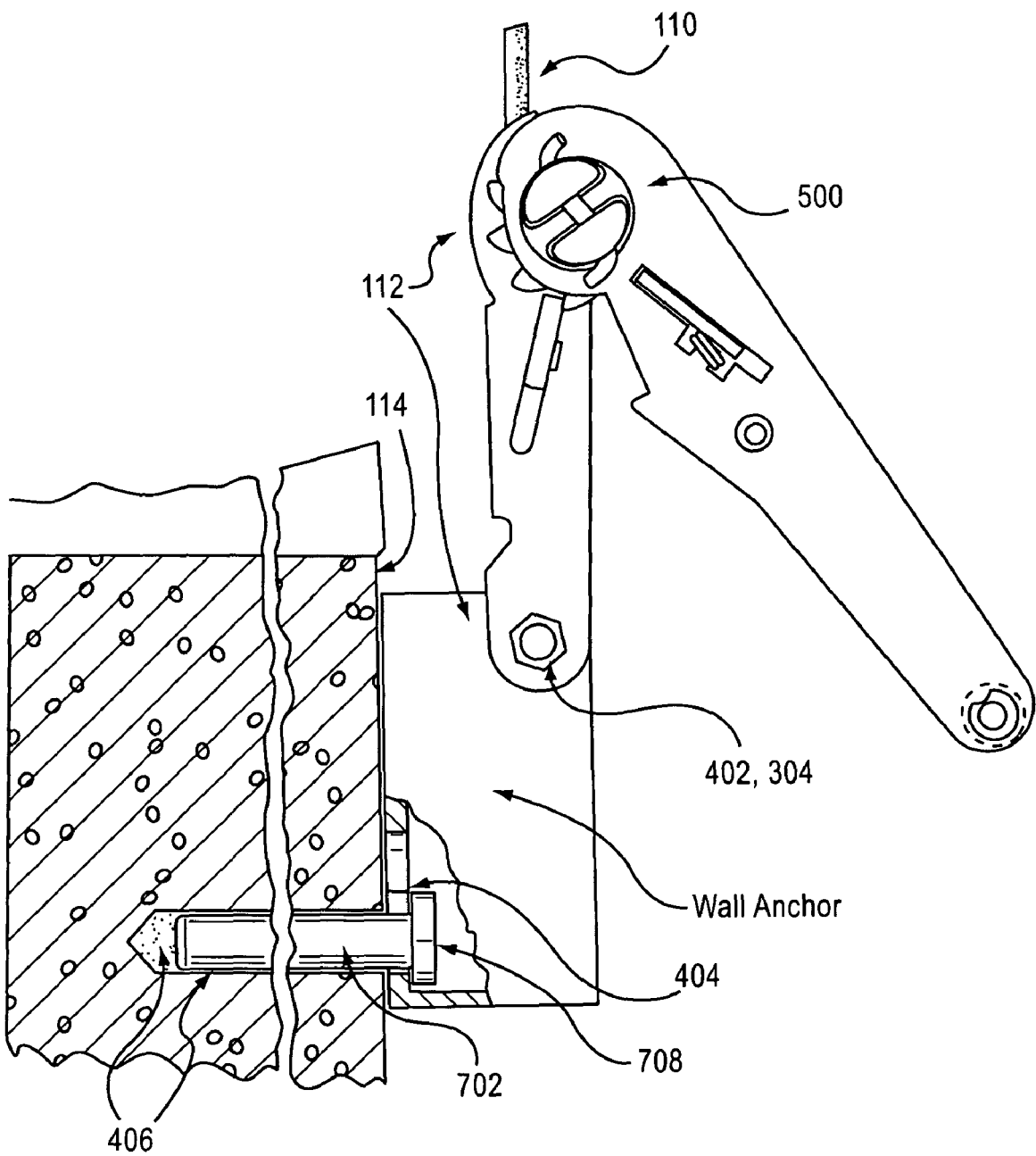
FIG. 7 illustrates that an anchor for anchoring one of plurality of tie-down straps at the foundation of the building.

From the roof of the building, each strap 110 is anchored to the foundation wall 114 of the building through a ratchet assembly 500 which is bolted to an anchor 112,115, as shown, for example, in FIG. 7. The ratchet 500 is connected to the anchor 112,115 by means of a pass through hole 402 which is configured to receive a threaded bolt with a lock nut 304. Other forms of attachment, such as a variable pass through hole at the end of the shaft 702 which is configured with a hole drilled through the shaft 702 to receive a cotter pin, may be used. One embodiment of the invention uses a lock nut 304, 402. Anchor 112,115 with a variable key hole slot 404 slips over a plurality of bolt heads 408,704. The bolts 408,704 are typically embedded in a two part epoxy 406, set in previously drilled holes, of various depth and dimension into the existing slab or foundation wall. The hex head bolt 708, anchor 112, and ratchet assembly 500 may alternatively be attached onto the existing slab surface wall 116, or an addition to the existing slab surface 113. When in use, anchor 115 which is configured with a plurality of key hole slots 404 with a pass through hole 402 to attach the ratchet 500 so as a unified load is centrally dispersed between the corresponding anchor bolts 408 and the ratchet assembly pass through hole 402. The head of the anchor bolt 408 may consist of a mushroom or pan head type, suitable to accept the keyhole attachment or may consist of a hex head design. The heads may be backed off or unscrewed from the threaded connector 410 from the surface plane of the floor plain 113,116 to provide the allowance for a variable thickness of the tubular stainless steel anchor to be attached.

In an embodiment of the invention, a threaded connector 410 is first applied in conjunction with a threaded mushroom or pan head bolt 408,704 of various lengths, thereby preventing the threaded connector 410 from filling with epoxy 406, and prior to setting into the two part epoxy which is predrilled into the surface plain of the concrete slab 113,116. Once the epoxy sets and cures, the threaded mushroom or pan head bolt 408,704 may be backed off sufficiently enough to allow keyhole slots 404 to slip over bolt heads 408, 708 to attach anchor 112,115 and ratchet assembly 500 when the tie-down system becomes deployed. Alternatively, when not in use, the threaded mushroom or pan head bolt 408 may be set flush to the floor surface to prevent obstruction due to foot traffic or other floor surface activity.

Figure 5:
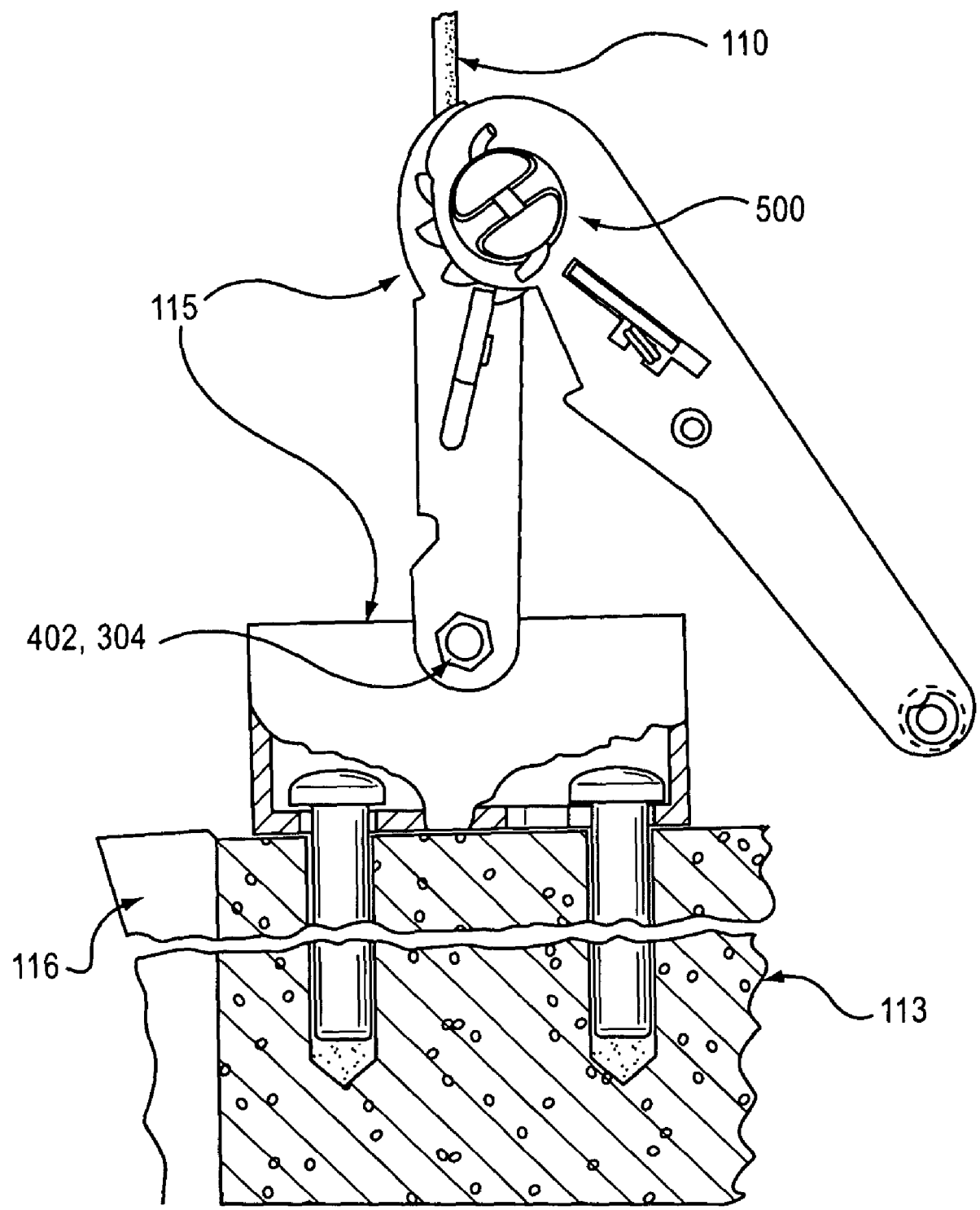
FIG. 5 illustrates an embodiment of the invention where one of plurality of tie-down straps is connected to a ratchet at the slab addition of a building.
Figure 6:
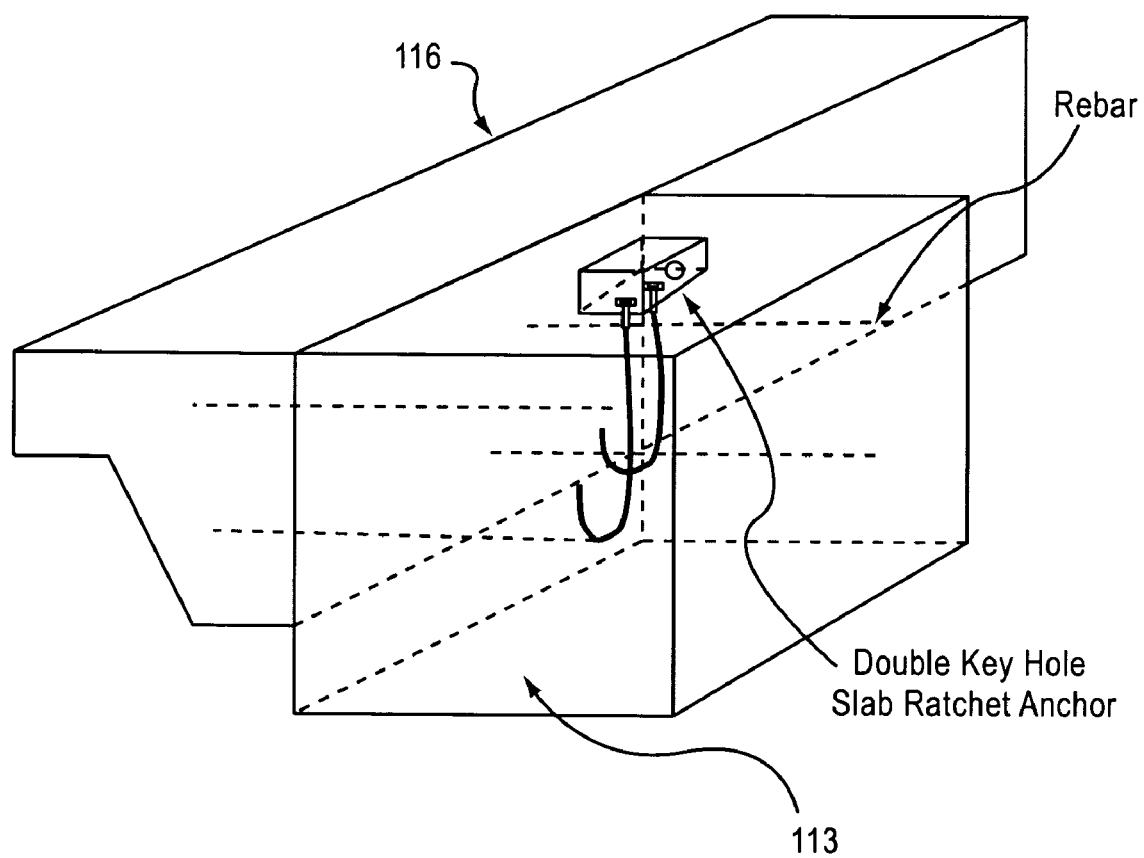
FIG. 6 illustrates a concrete slab which may be poured next to the foundation of the building.

FIG. 5 illustrates an embodiment of the invention where one of the pluralities of straps 110 is connected to a anchor assembly 115 at the foundation of the building. The ratchet 500 includes a split axle through which one of the pluralities of tie-down straps 110 can be inserted for engagement, to be wound around the axle. The axle is connected through a ratchet mechanism to a handle which is moved relative to frame members so as to roll tie-down strap 110 onto the axle and provide tension to strap 110. The frame members are connected by a bolt 402 to one end of the connector, the other end of which is connected to the anchor 112,115. The bolt 402 may be secured with a lock nut, pass through hole with a cotter pin or other quick attaching system. This allows fastening strap 110, ratchet 500 and connector assembly to anchor 112,115 quickly in the case of a hurricane warning. Specifically, each strap 110 from the roof is entwined in a reel of the ratchet assembly 500 through a slot in the ratchet, such that the strap coils around the reel of the ratchet which is bolted 402 to anchor 112,115.

Anchor 112,115 is rectangular metal tubing, such as stainless steel tubing with a preferably 0.11 gauge wall thickness, having a pair of holes to receive bolts 402 for securing ratchet assembly 500 to anchor 112,115. The holes are preferably near the top of anchor 112,115 so that anchor 112,115 does not interfere with the ratchet assembly 500. The bottom of anchor 112,115 includes keyhole slots for securing anchor 112,115 to one of the foundation bolt heads set in two part epoxy into the building's concrete slab 113,116, or to the buildings wall foundation 114. In an embodiment of the invention, concrete slab 113 may be poured next to or attached to the existing foundation of the building, as shown in FIG. 1a. Threaded connectors 410 may be embedded into concrete slab 113, when the concrete is being poured or drilled into the concrete slab 113, and set by means of a two part epoxy resin 406 or other suitable attaching means such as Tapcons®. When anchor 115 is not attached to the concrete slab 113,116 pan head bolts 408 may be fully tightened into the threaded connector 410 preventing debris from entering the threaded connector, or removed and replaced with a flat surface plug when not in use. To attach anchor 112,115 to the concrete slab, bolts 408 may be unscrewed from the threaded connectors 410 at approximately one quarter inch and the keyhole slots 404 of anchor 112,115 may be slipped over the pan head bolts 408 and locked onto the concrete slab.

In another embodiment of the invention, anchor 112,115 includes an anchor bolt 704 which is permanently fastened in a hole of the foundation wall of the building by means of epoxy resin 706 or other suitable means, as illustrated in FIG. 7. The anchor bolt 708 has a shank portion 702 and a head portion 704. Shank 702 may be threaded and head 704 may be hexagon 402 or pan head 408,704, such that anchor bolt 708 may comprise of various length and thickness for suitable anchor 112,115 attachment. In some embodiments anchor bolt 708 may comprise of a threaded screw with a threaded shank and a hexagon head. The head 704 of the anchor bolt 708 passes through the keyhole slot of anchor 112,115 for attachment of ratchet 500. This embodiment of the invention may be implemented in any exposed foundation wall with, for example, a cinder block foundation wall, a cement foundation wall, a steel column, wood pylon or stilt frame Thus, the ratchet assembly 500 and strap assembly 110 may be attached to a buildings foundation, horizontally, vertically, or to a helix anchor.

Figure 8:
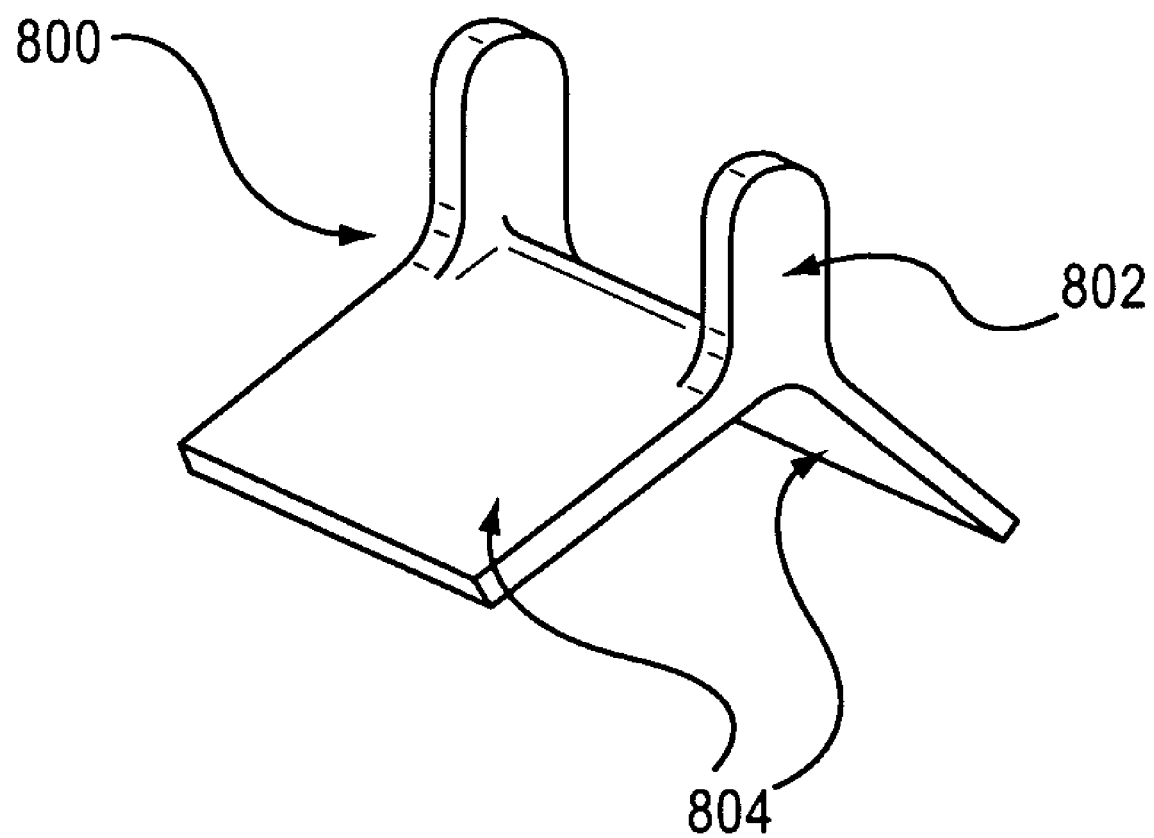
FIG. 8 illustrates a guide for the tie-down straps.

FIG. 8 illustrates a guide 800 for the tie-down straps, to keep them properly positioned above the roof ridge. Guide 800 may include a pair of ears 802 extending upwardly from the juncture of a pair of flaps 804 that may be used to fasten or otherwise secure guide 800 to the roof ridge or to channels 106 at the eave of the building, above the gutter. The guides rounded conformity between the ears 802 at the junction of the pair of flaps 804 provide the tie-down straps a smooth flow over the sharp 90 degree corner of the roof channels 106, once tension becomes applied to the straps by way of the ratchet assembly 500. Guides 800 may also be placed at the ridge location to also provide smooth flow over the roof peak or sharp 90 degree corner of the roof channels at the ridge.

FIG. 9a illustrates a gutter well 902 with a circular plug 906 attached at the pan base by means of an extrusion lock 904. A 2 inch circular pass through hole FIG. 9b is made in the bottom pan of the gutter 902 which allows the tie-down strap 110 to pass through the gutter 902 without collapsing it, as shown in FIG. 9b. If desired, when the system is not in use, the hole may be sealed with a rubber or plastic plug 906 to keep roof water from dripping excessively through the well when the system is not in use. FIG. 9c further illustrates the gutter plug's circular extrusion lock 904 which can easily be removed from the ground or on the roof in the event of the need to use the system.

The gutter plug 906 may be made from rubber or a polypropylene plastic composite and easily snaps into place with an extrusion lock 904 formed on the top portion of the plug. The size and dimension is such that the gutter plug fits a circular hole 903 cut into the bottom surface pan of the gutter 902. The outer bottom portion of the plug may be ¼ inch larger than the circumference of the hole size to prevent water leakage when the tie-down system is not in use. In the event that the tie-down system is deployed, the gutter plug is simply removed or snapped from position, using a downward push from a screw driver or other means to allow the tied down strap 110 to pass through the gutter 902 without collapsing the gutter, in route to be fastened into the ratchet assembly 112,115.

Thus, according to an embodiment of the present invention, a roof assembly 101, including rows of channel connectors 106 and roof channels 106, fastened to channel clips with flanges 202 fastened to the top fib 112,115 of interlocking roof assembly material 101, is tied down by a plurality of straps 110 and fastened to the foundation of a building through a plurality of ratchet assemblies 500 connected to a plurality of anchors 112,115. Each of the plurality of straps 110 is passed over a row of interconnected channel clip 202 and roof channels 106, fastened to the top rib of the interlocking roof materials 101, by means of channel clips with flanges 202, through a vertical displacement tensioning device 300, over another row of channel connectors 106, over another row of roof channels 106, fastened over another row of channel clips with flanges through another tensioning device 300, until the strap covers over the entire roof assembly and is thereafter connected, on opposite sides, to the foundation of the building. Hence, individual metal pan roof base materials 102 are one with interlocking roof assembly 101 and load from severe wind is transferred through roof assembly 101, as a unit, to the foundation of the building.

Figure 10:
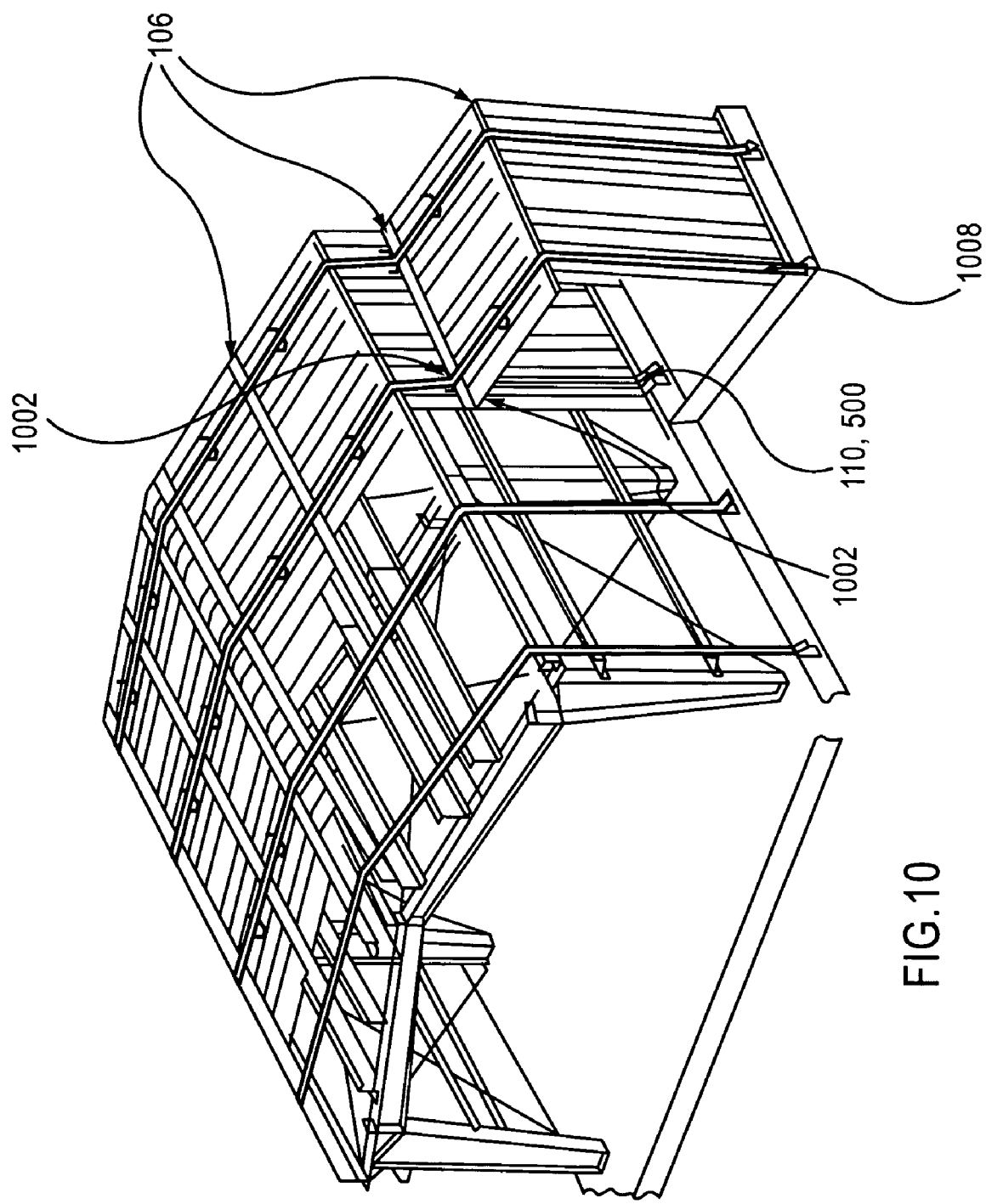
FIG. 10 illustrates a condition where a building add-on has been attached to the existing side wall of a main building structure.

FIG. 10 illustrates a condition where a building add-on has been attached to the existing side wall of a main building structure. The attached building 1004 may be an open carport or other enclosed building addition. The roof elevations and the uniformity of the roofing materials in such a configuration require a transverse tensioning device 1002. In addition to the pull down to the upper roof channel assembly where the add on is built, a transverse tension device 1002 is required below the channel 106, the interlocking roof assembly 101, at the ceiling location, to maintain a uniform uninterrupted downward force to straps and anchor attachments 1008, by means of an additional independent strap 110, and additional ratchet 500, and additional anchor assembly 112,115, and additional anchor bolts 408,708. Transverse tensioning device 1002 may be attached permanently to the underside of the bottom metal pan roof system. Alternatively, transverse tensioning device 1002 may temporary, have a keyhole slot 404 and temporarily installed in the event of a storm warning, so as to not detract from a finished ceiling appearance.

Figure 11:
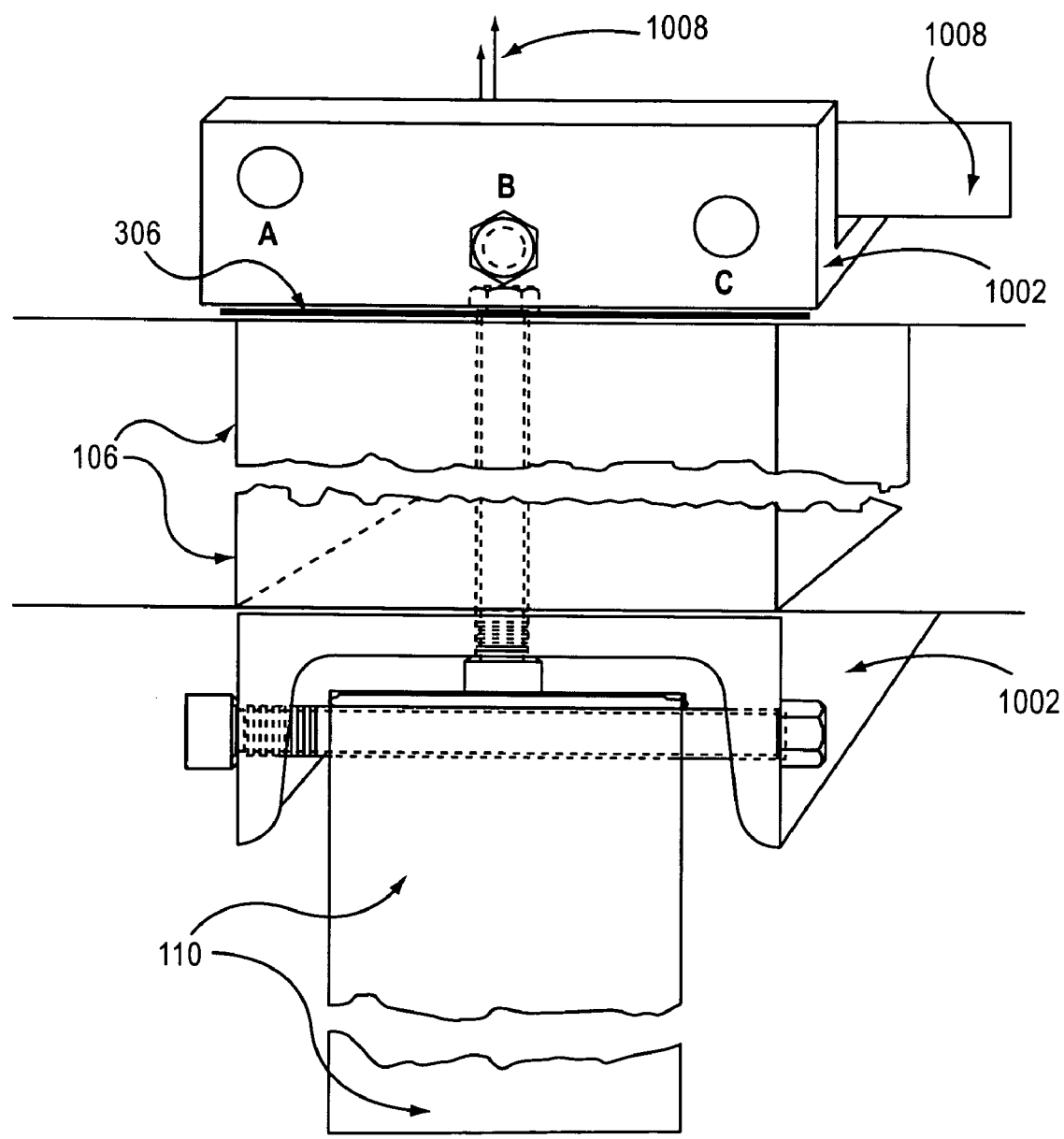
FIG. 11 illustrates an embodiment in which a pair of transverse tensioning devices are attached to the top channel and ceiling portion of the roof structure.

FIG. 11 illustrates an embodiment in which the transverse tensioning device is attached to the structure. The transverse tensioning device 1002 may be attached to channels 106, or the metal pan roof base 102, or to the underside of the interlocking roof assembly 101 below an adjacent transverse tensioning device FIG. 11 permanently or temporary to the underside of the ceiling plane of the add-on. In an embodiment of the invention, transverse tensioning device 1002 is configured to hook onto a pan head or other hex head bolt head assembly when deployment of the tie-down system is required. Transverse tensioning device 1002 may also be configured to be hooked or latched for temporary use, then stored when not in use.

It should be appreciated by one skilled in art, that the present invention may be utilized in any roofing structure that requires tying down prior to a severe or extreme wind storm, as described above. The foregoing description has been directed to specific embodiments of this invention. It will be apparent, however, that other variations and modifications may be made to the described embodiments, with the attainment of some or all of their advantages. The term "straps" as used in the appended claims should be understood to refer broadly both to what is conventionally viewed as a strap as well as to functionally similar structures, such as cables, wires, chains or other load bearing systems which can be used for tying down. The dimensions indicated in the discussion above should be understood as approximate, whether or not a word of approximation is employed. Therefore, it is the object of the appended claims to cover all such variations and modifications as come within the true spirit and scope of the invention. The scope of the invention should be determined, therefore, by reference to the attached claims.

The invention claimed is:

1. A strapping system comprising:
 a roof assembly comprising a plurality of receiving channels, each of the plurality of receiving channels being fastened to interconnected roof materials connected to a roof structure, and a plurality of roof channels that are connected by the plurality of receiving channels and fastened to the interconnected roof materials, such that a row of interconnected roof channels and receiving channels is placed over the interconnected roof materials along a length of a roof structure;
 a plurality of straps for tying down the roof assembly to a corresponding plurality of anchors, each of the plurality of anchors being secured at predetermined distances at opposite sides of a foundation of a building;
 a plurality of tensioning devices mounted, at predetermined distances, on the roof materials between rows of interconnected roof channels and receiving channels, the plurality of tensioning devices being for eliminating vertical displacement of the fastened straps;
 wherein each of the plurality of straps is placed at a predetermined distance along the length of the roof structure over rows of interconnected roof channels and receiving channels and threaded in a corresponding tensioning device that is lined up with a corresponding anchor at the foundation of the building, and
 on opposite sides of the building, each of the plurality of straps is fastened to a corresponding ratchet assembly attached to a corresponding anchor, thereby transferring load from the roof assembly to the foundation of the structure during a wind storm.

2. The strapping system of claim 1, wherein each of the plurality of anchor comprises:
 a pair of holes to receive bolts for securing the corresponding ratchet assembly; and
 a keyhole slot on the surface of the anchor for securing the anchor to a bolt or plurality of bolts embedded in one of the foundation of the building, concrete wall, concrete slab, or concrete slab extension to the foundation of the building.

3. The strapping system of claim 2, wherein the anchor is secured to the concrete slab extension to the foundation of the building by attaching the slot on the bottom surface of the anchor over bolts embedded by use of two part epoxy into a hole drilled into the concrete slab.

4. The strapping system of claim 2, wherein the anchor is connected to the side wall of the foundation of the building by a bolt which is embedded by use of two part epoxy set into a hole drilled into the side wall of the foundation of a building.

5. The strapping system of claim 1, further comprising a plurality of guides for positioning each of the plurality of straps over the roof channels.

6. The strapping system of claim 1, wherein each of the plurality of tensioning devices includes at least one bolt assembly for tightening one of the plurality of straps which is treaded through the tensioning device to eliminate vertical displacement of the tightened straps.

7. The strapping system of claim 1, wherein each of the plurality of tensioning devices includes an adhesive materials under a bottom surface for preventing water intrusion though the roof structure.

8. The strapping system of claim 1, where a cap is placed at the end of each row of interconnected roof channels and receiving channels.

9. The strapping system of claim 1, wherein each of the plurality of receiving channels is screwed to a top rib of interconnected roof materials at a predetermined distance.

10. The strapping system of claim 1, wherein each of the plurality of receiving channels includes a bottom portion including clips for screwing the receiving channel to the roof materials and a top portion between which two roof channels are connected.

11. The strapping system of claim 1, wherein a first row of interconnected roof channels and receiving channels is placed at an eave of the roof structure, near a gutter assembly and rows of interconnected roof channels and receiving channels are placed at predetermined distances from the eave to a ridge of the roof, wherein the placement of the rows of interconnected roof channels and receiving channels occurs on opposite sides of the building.

12. The strapping system of claim 1, further comprising a transverse tensioning device configured to maintain a uniform downward force for an attached building structure.

13. The strapping system of claim 12, wherein the transverse tensioning device is attached permanently to the underside of a roof system by a keyhole slot attachment.

14. The strapping system of claim 12, wherein the tensioning device is temporarily attachable to a keyhole slot attachment in the event of a storm warning.

15. The strapping system of claim 1, wherein the roof assembly comprises any roofing structure that requires tying down during severe wind storms.

\* \* \* \* \*